(12) United States Patent
Steenstra et al.

(10) Patent No.: US 7,324,836 B2
(45) Date of Patent: Jan. 29, 2008

(54) NON-WIRELESS COMMUNICATION USING SOUND

(75) Inventors: Jack Steenstra, San Diego, CA (US);
Paul E. Jacobs, San Diego, CA (US);
Ahmad Jalali, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 40 days.

(21) Appl. No.: 10/670,078

(22) Filed: Sep. 23, 2003

(65) Prior Publication Data

US 2005/0075134 A1   Apr. 7, 2005

(51) Int. Cl.
*H04B 1/38* (2006.01)
*H04M 1/00* (2006.01)
(52) U.S. Cl. .................... 455/559; 455/550.1
(58) Field of Classification Search ........... 455/74.1, 455/550.1, 556.1, 557, 575.1, 575.2, 90.3, 455/559
See application file for complete search history.

(56) References Cited

U.S. PATENT DOCUMENTS

| 5,873,045 | A  | * | 2/1999  | Lee et al. ............... 455/556.2 |
| 6,006,109 | A  | * | 12/1999 | Shin ........................... 455/557 |
| 6,181,782 | B1 | * | 1/2001  | Sonoda ................... 379/90.01 |
| 6,190,190 | B1 | * | 2/2001  | Daly et al. ................. 439/218 |
| 2001/0055352 | A1 | * | 12/2001 | Bannasch et al. .......... 375/348 |
| 2003/0144040 | A1 | * | 7/2003  | Liu et al. ................ 455/575.2 |

* cited by examiner

*Primary Examiner*—Lewis West
(74) *Attorney, Agent, or Firm*—Amin, Turocy & Calvin, LLP (57) ABSTRACT

Method and apparatus are disclosed to allow non-wireless transmission or reception of data from one device to at least another device. More particularly, in one embodiment, a jack of a first device is configured to receive incoming analog signals encoded with digital data from the second device and to transmit outgoing analog signals encoded with digital data to the second device. The first device may also comprise a first conversion unit configured to encode digital data into the outgoing analog signals and a second conversion unit configured to recover digital data from the incoming analog signals.

22 Claims, 4 Drawing Sheets

NON-WIRELESS COMMUNICATION USING SOUND

BACKGROUND

I. Field of Invention

The invention generally relates to data communications, and more particularly to non-wireless communications of digital data from one device to another device using sound.

II. Description of the Related Art

Advances in communication technology have made it easier and faster to share and/or transfer information. High volumes of data can be communicated through data transmission systems such as terrestrial communication systems or satellite communication systems and/or local or wide area networks (for example, the Internet). These systems generally require complicated hardware and/or software and are typically designed for high data rates and/or long transmission ranges. For transfers of data at close proximity or short distances, such as between two mobile phones, the systems above may be undesirable because of the complexity, network or system access delays, inconvenience of use and/or the cost.

In addition, the functionality of portable devices, such as mobile phones, continues to grow. This increase in the functionality has created a need to more easily communicate information from one portable device to another. For example, there is a desire to share contents of address books, music, graphics and/or other data from one mobile phone to another. Furthermore, with the growing popularity of multi-player gaming, it is desirable to quickly and reliably communicate information among one or more portable devices.

Therefore, there is need for a less complex, yet user-friendly, inexpensive and/or efficient way to share and/or transfer information.

SUMMARY

Embodiments as disclosed allow digital data to be transmitted and/or received using a jack as an external interface into a device. In one aspect, an apparatus for use in a first device to receive digital data from a second device comprises a jack configured to receive analog signals encoded with the digital data, and a conversion unit coupled to the jack and configured to recover the digital data from the analog signals. In another aspect, an apparatus for use in a first device to transmit digital data to a second device comprises a conversion unit configured to encode the digital data into analog signals, and a jack coupled to the conversion unit and configured to transmit the analog signals encoded with digital data.

Either one or both apparatus above may further comprise a non-wireless communication device configured to couple with the jack, the non-wireless communication device configured to carry the analog signals encoded with digital data from the first device using the jack. The non-wireless communication device may comprises a non-wireless medium having a first end and a second end, a first plug coupled to said first end and configured to couple to the jack, and a second plug coupled to said second end and configured to couple to a jack of the second device. Also, the jack may be configured to couple to either one of a headphone or a headset. Moreover, the jack may be configured to output perceptible sound.

In still another aspect, a method for use in a first device to receive digital data from a second device comprises receiving analog signals encoded with the digital data using a jack, and recovering the digital data from the analog signals. In yet another aspect, a method for use in a first device to transmit digital data to a second device comprises encoding the digital data into analog signals, and transmitting the analog signals encoded with digital data using a jack.

Either one or both the methods above may further comprise coupling a non-wireless communication device to the jack, and receiving or transmitting, respectively, the analog signals through the non-wireless communication device. Here, receiving the analog signals may comprises receiving the analog signals as audible analog signals or receiving the analog signals electronically.

In a further aspect, an apparatus for use in a first device to receive digital data from a second device comprises means for receiving through a jack analog signals encoded with the digital data, and means for recovering the digital data from the analog signals. An apparatus for use in a first device to transmit digital data to a second device comprises means for encoding digital data into analog signals, and means for transmitting through a jack the analog signals encoded with digital data.

In still a further aspect, an apparatus for use in a first device to communicate digital data with a second device comprises means for receiving incoming analog signals encoded with digital data from the second device, means for transmitting outgoing analog signals encoded with digital data to the second device, means for encoding digital data into the outgoing analog signals, and means for recovering digital data from the incoming analog signals. A method for communicating digital data from a first device to a second device comprises receiving incoming analog signals encoded with digital data using a jack, transmitting outgoing analog signals encoded with digital data using the jack, recovering digital data from the incoming analog signals, and encoding digital data into the outgoing analog signals.

In yet a further aspect, an apparatus for connecting a first device having a first jack with at least one second device having a second jack to allow communication comprises a non-wireless medium having a first end and a second end, a first plug coupled to said first end and configured to connect to the first jack, and a second plug coupled to said second end and configured to connect to the second jack.

BRIEF DESCRIPTION OF THE DRAWINGS

Various embodiments will be described in detail with reference to the following drawings in which like reference numerals refer to like elements, wherein.

DETAILED DESCRIPTION

Many devices and/or computers have either a built-in headset jack or various other jacks for receiving and/or outputting perceptible sound. Namely, in some devices, these jacks allow users to listen to music and/or vocal communication without disturbing the public. In mobile phones, jacks allow users to converse hands free and/or to converse in private. Current jacks are not used for transmission of digital data. In the following description, embodiments allow non-wireless transfer of digital data from one device to at least another device, using jacks.

As disclosed herein, the term "cord" refers to a non-wireless medium that transfers analog signals. Examples of a non-wireless medium includes, but is not limited to, one or more wire lines, tubes, twisted wires, cables, coaxial cables or fiber optic cables. The term "jack" refers to a hardware receptacle such as, but is not limited to, a socket, a Universal Serial Bus (USB) communications (COM) port and serial COM port. The term "plug" refers to various connectors that fit into a jack such as, but is not limited to, pins and Mini-DIN plugs. The term "sound wave" refers to acoustic wave or pressure waves or vibrations traveling through gas, liquid or solid. Sound waves include ultrasonic, audio and infrasonic waves. The term "audio wave" refers to sound wave frequencies lying within the audible spectrum, which is approximately 20 Hz to 20 kHz. The term "ultrasonic wave" refers to sound wave frequencies lying above the audible spectrum and the term "infrasonic wave" refers to sound wave frequencies lying below the audible spectrum. The term "storage medium" represents one or more devices for storing data, including read only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other devices capable of storing, containing or carrying codes and/or data.

Also, various aspects, features and embodiments of the data communication system may be described as a process that can be depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a software, a subroutine, a subprogram, or a combination thereof.

Furthermore, the embodiments will be described with reference to mobile phones for purposes of explanation. However, it is to be noted that the concept of the invention is not limited to mobile phones and may apply to various other devices implemented with a jack. Examples of other devices includes, but is not limited to, personal digital assistant (PDA), digital cameras, smart phones, laptop computers, desktop computers, toys, electronic gaming devices and various electronic appliances. Accordingly, digital data communication using jacks may be from portable to portable device(s), from portable to non-portable device(s), from non-portable to portable device(s) and from non-portable to non-portable device(s).

Figure 1:
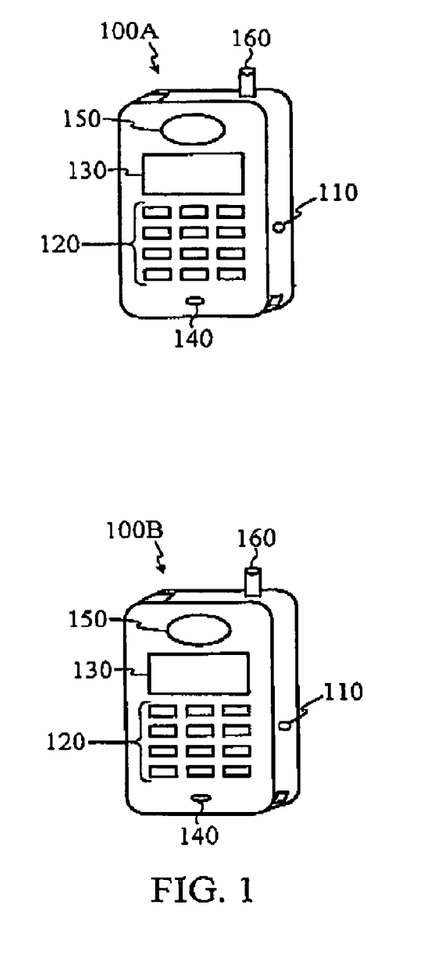
FIG. 1 shows examples of mobile phones.

FIG. 1 shows examples of mobile phones 100A and 100B. Mobile phones 100A and 100B comprise a jack 110 configured to connect with a conventional hands free device (HFD), as described below. Mobile phones 100A and 100B, each may also comprise other elements such as a keypad 120 or various other input element, a liquid crystal display 130 or various other display element, a microphone 140 or various other audio input element, a speaker 150 or various other audio output element 150 and antenna 160.

Figure 2:
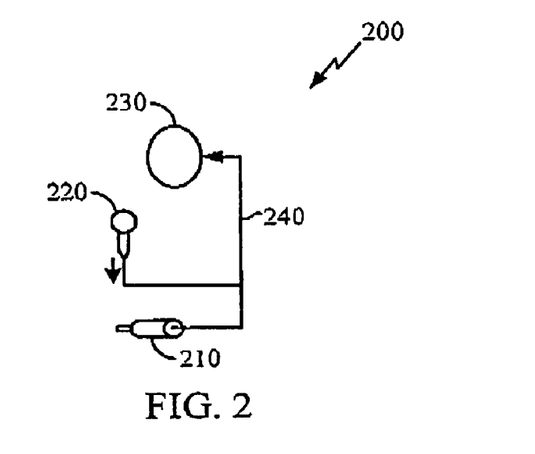
FIG. 2 shows an example of a hands free device.

FIG. 2 shows a typical HFD 200 comprising a plug 210, an audio input element 220 and an audio output element 230 on a cord 240. Plug 210 is configured to couple to jack 110 to allow users to listen to perceptible sound such as music and/or speech carried by cord 240 through audio output element 230. When plug 210 is coupled to jack 110, HFD 200 also allows users to converse hands free by speaking through audio input element 220 and listening through audio output element 230.

HFD 200 may be one of various types of headsets, headphones, or other attachments for holding audio input and output elements over, under or around a user's ear or head. Such devices are generally an inexpensive accessory that allow users to operate a phone hands free. A hands free device can also provide users some measure of privacy and/or freedom to operate the phone without disturbing others nearby. Accordingly, most if not all mobile phones are implemented with a jack to allow users to use a hands free device.

Figure 3:
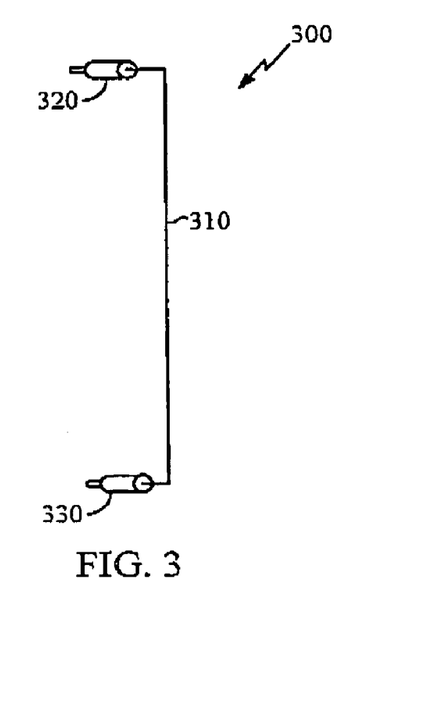
FIG. 3 shows an example of a non-wireless communication device for connecting devices.

Therefore, a non-wireless communication device 300 as shown in FIG. 3 is provided to allow users to transmit and/or receive digital data from one device to another using a jack. Non-wireless communication device 300 comprises a non-wireless medium 310 having a first end and a second end. A first plug 320 is coupled to the first end and is configured to couple with jack 110 of mobile phone 100A. A second plug 330 is coupled to the second end and is configured to couple with jack 110 of mobile phone 100B.

Non-wireless medium 310 may be a cord configured to carry analog signals as audible analog signals or may be a cord configured to carry analog signals electronically. Non-wireless medium is used as a waveguide for the analog signals. More particularly, non-wireless medium may comprise an electrical conducting material capable of carrying analog signals as electrical signals from first plug 320 to second plug 330. In such cases, plugs 320 and 330 may be configured to have a structure, composition and/or operation that are/is identical or substantially identical to plug 210. Other non-wireless mediums may comprise a sound-insulated hollow material to carry analog signals as audio waves, i.e. audible sound, from first plug 320 to second plug 330. In such cases, plugs 320 and 330 may be configured to have a structure that is identical or substantially identical to plug 210, but operable in a different manner. Namely, plugs 320 and 330 may be configured to convert electrical signals into sound and sound into electrical signals by use of, for example, a diaphragm or other devices known in the art. Accordingly, plugs 320 and 330 would fit into jack 110 and a separate jack need not be implemented for plugs 320 and 330. However, it would be apparent to those skilled in the art that the invention is not limited to having a single jack for both plugs 210 and plugs 320, 330.

For digital data transmission/reception, non-wireless communication device 300 connects two or more devices such as mobile phones 100A and 100B by coupling plugs 320 and 330 with jacks of the devices. Digital data is transmitted from a first device such as mobile phone 100A through a jack, received by plug 320 and is carried to a second device such as mobile phone 100B by non-wireless communication device 300. The second device then receives the digital data from non-wireless communication device 300 through plug 330 and a jack. More particularly, to transmit and/or receive digital data using a jack and non-wireless communication device 300, a first device encodes the digital data into analog signals and a second device recovers the digital data from the received analog signals.

Figure 4:
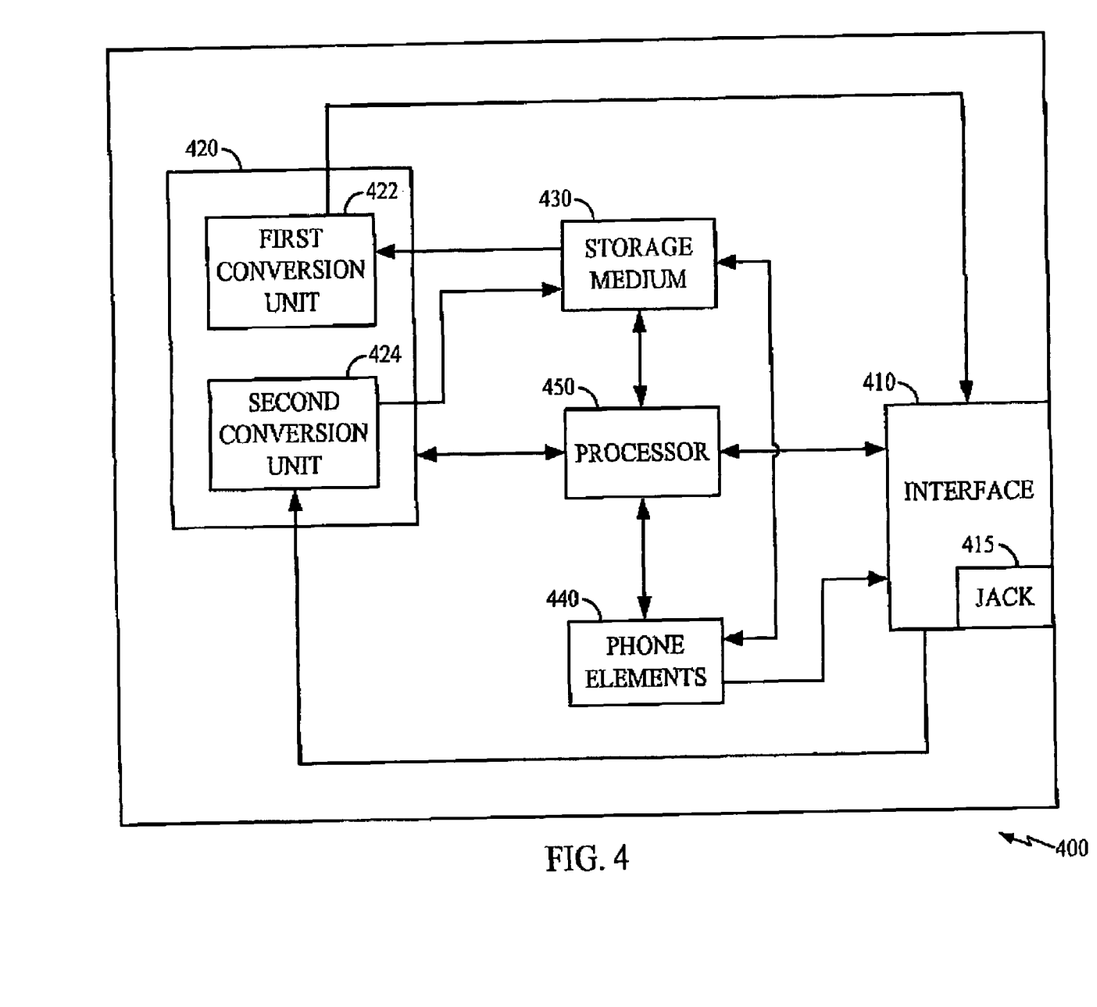
FIG. 4 is an example block diagram of a device capable of communication using a jack.

FIG. 4 shows a schematic block diagram of a device 400 capable of communication using a jack. Device 400 may comprise an interface 410, a conversion unit 420, a storage medium 430 and a processor 450. A more typical commercial device 400 may comprise additional components depending upon the type of device or the various modes in which a device can function. For example, as a mobile phone, device 400 would also comprise phone elements 440. As a personal digital assistant (PDA), device 400 would comprise PDA elements rather than phone elements 440 and as a smart phone, device 400 would comprise both phone and PDA elements 440. Also, it should be noted that the elements of device 400 may be rearranged without affecting the operation of device 400.

More particularly, interface 410 comprises a jack 415 configured to couple with a HFD to allow users to listen or converse hands free as described above. Jack 415 can also be coupled to a non-wireless communication device such as non-wireless communication device 300 described above. Conversion unit 420 comprises a first conversion unit 422 configured to encode digital data into analog signals and a second conversion unit 424 configured to recover digital data from analog signals. Although first and second conversion units 422 and 424 are shown as separate elements within conversion unit 420, first and second conversion units 422 and 424 may be implemented together in one unit. Details in the operations of first and second conversion units 422 and 424 will be discussed later below.

Digital data to be transmitted is encoded into analog signals by first conversion unit 422 and is transmitted by interface 400 as an analog signal using jack 415. Here, digital data to be transmitted may be stored in storage medium 430. The digital data may be, but is not limited to, personal information; contact information such as names, phone numbers, and addresses; business information; calendar information; memos; data relating to games; software or a combination thereof. The analog signal encoded with digital data is then carried by a non-wireless communication device and is received by a second device, analogous to device 400, capable of communication using a jack.

Accordingly, the second device may also transmit analog signals encoded with digital data to device 400 in a similar manner. When analog signals encoded with digital data is transmitted to device 400, the analog signals are received by interface 415 of device 400 using jack 415. Second conversion unit 424 then recovers the digital data from the analog signal. Similarly, when second device receives analog signals encoded with digital data, the second device recovers digital data from the analog signals in a manner analogous to the manner as described with reference to device 400.

In the above description, the encoding and recovery of digital data is controlled by processor 450. Processor 450 may also control the functionality of phone elements 440 to allow users to make and receive calls. Accordingly, processor 450 may control the various modes of device 400, such as the phone mode or the data communication mode. Processor 450 may be a central processor (CPU), a microprocessor, a digital signal processor (DSP), or various other controller. It would be apparent to those skilled in the art that the placement of processor 450 is not important and that the placements of elements 410-440 may also be rearranged without affecting the performance and/or purpose of device 400. Similarly, one or more of interface 410, conversion unit 420, storage medium 430, phone elements 440 and processor 450 may be implemented together in one unit. Furthermore, additional storage medium(s) and/or processor(s) may be implemented to separate the storage and/or control functions of conversion unit 420 and phone elements 440.

The operations of the data communication mode will next be discussed. It is to be noted that the operations of phone mode will not be discussed as operation of phone elements 440 are well known and/or is not of importance for purposes of explaining the invention. Similarly, for other modes such as PDA and/or smart phone modes will also not be discussed.

Figure 5:
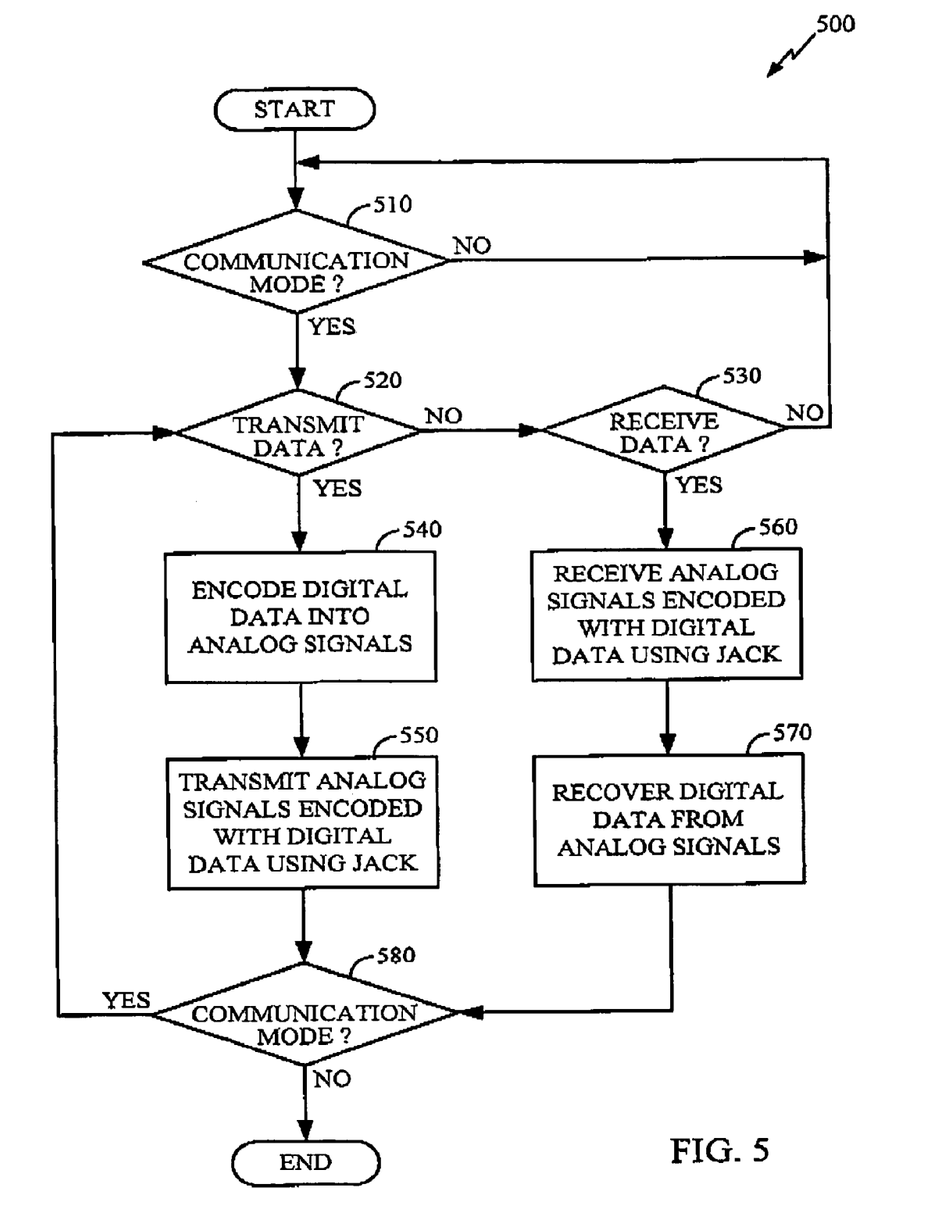
FIG. 5 shows an example process for digital data communication using a jack.

FIG. 5 shows one embodiment of a process 500 for data communicating using a jack. Process 500 begins by determining (510) whether a device such as device 400 is in a digital data communication mode. Here, the device may enter into communication mode based upon user input or selection to communicate using a jack. The communication mode may also be entered automatically based upon the function being performed by the device. For example, if a multi-player game is activated on the device, the communication mode may automatically be entered. Also, the determination may be made by processor 450 for device 400.

If the device is in the communication mode, a determination is made whether digital data is to be transmitted (520) or received (530). Such determination may also be made by processor 450 for device 400. If digital data is to be transmitted, digital data is encoded (540) into outgoing analog signals and the outgoing analog signals encoded (550) with digital data is transmitted using a jack. If digital data is to be received, incoming analog signals encoded with digital data is received (560) and digital data is recovered (570) from the incoming analog signals. Here, digital data may be encoded into outgoing analog signals by first conversion unit 422 and recovered from incoming analog signals by second conversion unit 424 in device 400. Thereafter, a determination (580) is made whether the device is still in the communication mode, i.e. whether there are more digital data to be transmitted and/or received. If the device is in the communication mode, process 500 returns to the determination (520) of whether data is to be transmitted. Otherwise, process 500 ends.

In the above description of process 500, a determination of whether digital data is to be received may be made before the determination of whether digital data is to be transmitted. Moreover, a further determination may be made whether a non-wireless communication device has been coupled to the jack before transmitting and/or receiving analog signals. In some devices, for example device 400, the interface such as interface 410 may be implemented with a sensor configured to detect whether a plug has been coupled to the jack. In other embodiments, a control signal may be transmitted from a device to a second device and if the second device returns a response signal, a determination that a non-wireless communication device has been coupled is made.

Therefore, digital data may be encoded into analog signals and transmitted from a first device to at least a second device. Digital data can then be recovered from the analog signals received by the second device. Digital data can be encoded into analog signals and recovered from analog signals in one of various ways.

Generally, a digital to analog converter (DAC) may be used in a known manner to encode digital data into analog signals and an analog to digital converter (ADC) may be used in a known manner to recover the digital data from analog signals. Here, digital data is converted to audio waves having frequencies in the range of approximately 1 kHz to 3 kHz are used such that a standard jack can be used to transmit and/or receive analog signals encoded with digital data. Accordingly, in device 400 for example, first conversion unit 422 would comprise a DAC to convert digital data into audio wave signals for encoding and transmission using a jack. Conversely, second conversion unit 424 would comprise an ADC to convert audio wave signals, received using a jack, into digital data for recovery of the digital data.

In another embodiment, a multi-carrier (MC) modulation may also be used to encode digital data into analog signals and MC demodulation is used to recover the digital data from the analog signals. As described above, audio waves having frequencies in the range of approximately 1 kHz to 3 kHz are used such that a standard jack can be used to transmit and/or receive analog signals encoded with digital data. A multi-carrier system is described in co-pending U.S. application Ser. No. 10/356,144 entitled "Wireless communication using sound" and co-pending U.S. application Ser. No. 10/356,425 entitled "Communication using audible tones," both of which are assigned to the same assignee of the present application.

Figures 6, 7:
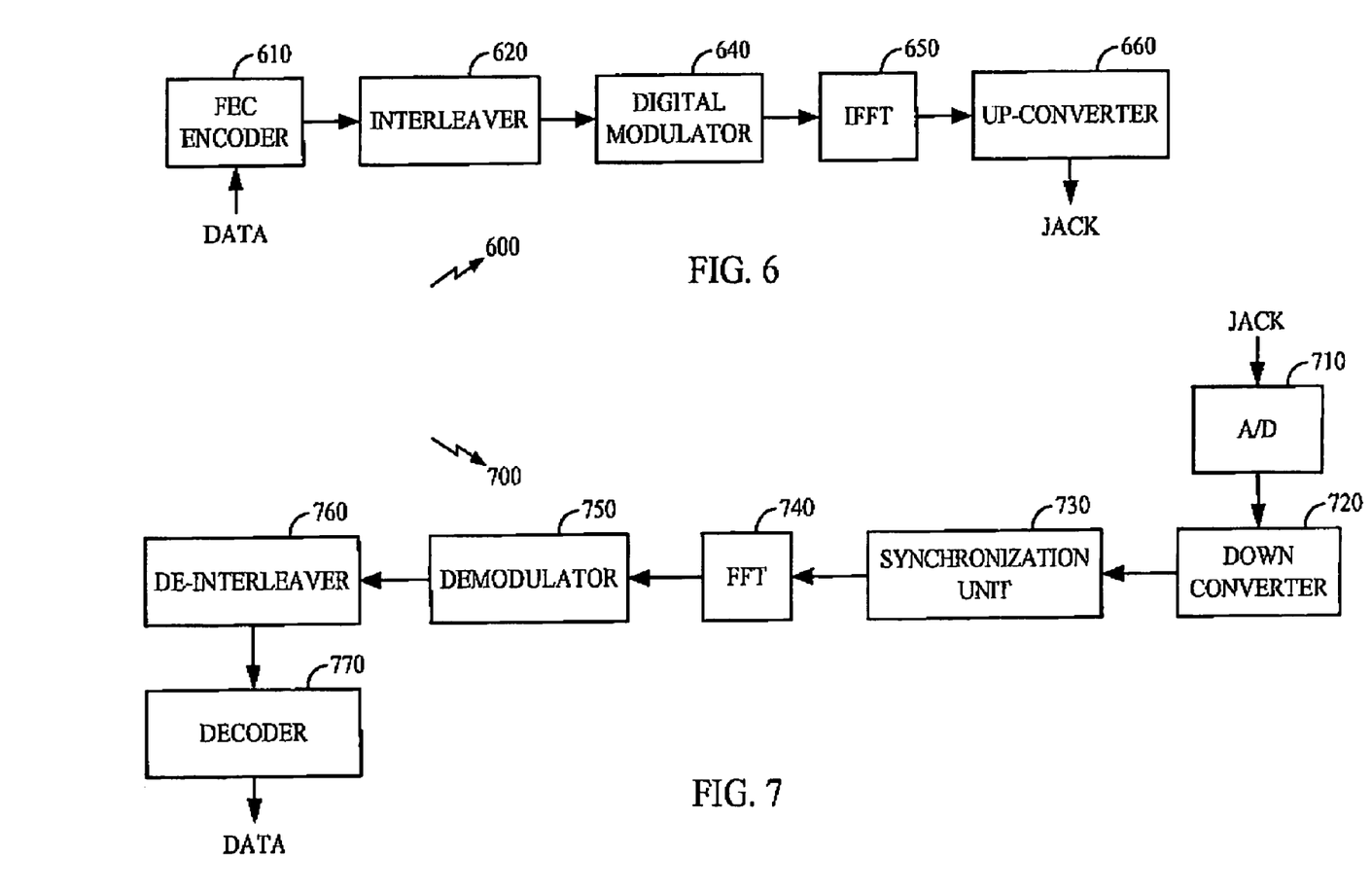
FIG. 6 is an example first conversion unit of a device capable of communication using a jack.
FIG. 7 is an example second conversion unit of a device capable of communication using a jack.

Generally, first conversion unit 422 may comprise a MC modulation unit configured to encode digital data into outgoing multiple audio wave carriers for transmission. FIG. 6 shows an example first conversion unit 600 for encoding digital data into outgoing multiple sound wave carriers. First conversion unit 600 may comprise a forward error correction (FEC) element 610, an interleaver 620, a digital modulator 640, an inverse fast fourier transform (IFFT) element 650 and an up-converter 660. First conversion unit 600 may also comprise a preamble generator (not shown) configured to generate synchronization preambles. The synchronization preambles are transmitted to help a receiving device in synchronizing to the frequency, time and phase of the received signal. FEC element 610 is configured to encode digital data bit sequence to be transmitted. The FEC encoded bits are then interleaved into code symbols by interleaver 620. The code symbols are modulated into multiple audio wave carriers by digital modulator 640 and inverse fast fourier transformed by IFFT element 650 to generate analog signals, called MC symbols. The MC symbols are then up converted by up-converter 660 for transmission as audio waves through interface 410 using jack 415.

FIG. 7 shows one embodiment of a second conversion unit 700 corresponding to first conversion unit 600 for processing multiple audio waves encoded with digital data information. Generally, digital data is recovered from the multiple audio waves in a process that is inverse to the process for transmitting the data as audio waves. Second conversion unit 700 may comprise an analog to digital (A/D) converter 710 configured to convert the incoming multiple audio waves from an analog to a digital signal, a down-converter 720 configured to down convert the digital signal, a synchronization unit 730 configured to synchronize to the carrier in phase and arrival time of incoming data sequence, a fast fourier transform (FFT) 740 configured to recover the MC symbols, a demodulator 750 configured to demodulate the MC symbols, a de-interleaver 760 configured to de-interleave the demodulated data, and a decoder 770 configured to decode the de-interleaved data using one of various known techniques and recover the digital data.

Accordingly, digital data can be encoded into analog signals, transmitted and received using jacks, and recovered. Using a non-wireless communication device to carry analog signals from device to device, a convenient and/or efficient way to communicate digital data is provided. In addition, it would be relatively simple and inexpensive to implement a conversion unit into existing devices having a standard or conventional jack by encoding digital data into audio waves for transmitting and/or receiving using jacks.

Moreover, although the embodiments have been described to allow both transmission and reception of data, some devices may be implemented to transmit only and some devices may be implemented to receive only. For example, second conversion unit 424 would be omitted in device 400 to allow only transmission of data. Similarly, first conversion unit 422 would be omitted in device 400 to allow only reception of data. Furthermore, digital data communication may be a simplex communication, a half-duplex communication or full-duplex communication.

For example, simplex communication may be used for transferring contact information from an address book of one device to an address book of another. A half-duplex communication may be used for synchronizing non-empty address books of devices. A full-duplex communication may be used for exchanging data during multi-player games. Here, the multi-player game may be an on-line network game, if devices have access to a network such as the Internet. In such case, full-duplex communication would especially useful for data communication to allow an interactive game.

Finally, one or more elements of device 400 may be implemented by hardware, software, firmware, middleware, microcode, or any combination thereof. When implemented in software, firmware, middleware or microcode, the program code or code segments to perform the necessary tasks may be stored in a machine readable medium such as storage medium 430 or in a separate storage(s) not shown. A processor such as processor 450, may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It should be noted that the foregoing embodiments are merely examples and are not to be construed as limiting the invention. The description of the invention is intended to be illustrative, and not to limit the scope of the claims. As such, the present teachings can be readily applied to other types of apparatuses and many alternatives, modifications, and variations will be apparent to those skilled in the art.

What is claimed is:

1. Apparatus for use in a first device to receive digital data non-wirelessly from a second device and to transmit digital data non-wirelessly to the second device, the apparatus comprising:
   a single jack configured to couple to either one of a headphone or a headset and to receive analog signals encoded with the digital data from the second device and to transmit analog signals encoded with digital data to the second device;
   a first conversion unit coupled to the single jack and configured to encode digital data into analog signals for transmission to the second device; and
   a second conversion unit coupled to the single jack and configured to recover the digital data from the analog signals received from the second device;
   wherein the first device is one of a mobile phone, a personal digital assistant or a smart phone and wherein the second device is one of a mobile phone, a personal digital assistant or a smart phone.

2. The apparatus of claim 1, further comprising:
a non-wireless communication device configured to couple with the jack, the non-wireless communication device configured to carry the analog signals encoded with digital data to the first device using the jack.

3. The apparatus of claim 2, wherein the non-wireless communication device comprises:
a non-wireless medium having a first end and a second end;
a first plug coupled to said first end and configured to couple to the jack; and
a second plug coupled to said second end and configured to couple to a jack of the second device.

4. The apparatus of claim 1, wherein the jack is configured to receive perceptible sound.

5. The apparatus of claim 1, wherein the first conversion unit is further configured to encode digital data based on multi-carrier modulation and the second conversion unit is further configured to recover digital data based on multi-carrier demodulation.

6. The apparatus of claim 5, further comprising:
a sensor configured to detect whether a plug has been coupled to the single jack.

7. The apparatus of claim 1, wherein the single jack is configured to couple to either one of a headphone or a headset, the apparatus comprising a determining circuit which determines that one of a mobile phone, a personal digital assistant or a smart phone is connected to the jack by way of transmission of a control signal and return of a response signal.

8. A method for use in a first device to receive digital data non-wirelessly form a second device and to transmit digital data non-wirelessly to the second device, the method comprising:
receiving analog signals encoded with the digital data from the second device using a single jack that is configured to couple to either one of a headphone or a headset;
recovering the digital data from the analog signals received from the second device;
encoding digital data into analog signal; and
transmitting the analog signals encoded with digital data to the second device using the signal jack;
wherein the first device is one of a mobile phone, a personal digital assistant or a smart phone and wherein the second device is one of a mobile phone, a personal digital assistant or a smart phone.

9. The method of claim 8, further comprising:
coupling a non-wireless communication device to the jack; and
receiving the analog signals through the non-wireless communication device.

10. The method of claim 9, wherein receiving the analog signals comprises:
receiving the analog signals as audible analog signals.

11. The method of claim 9, wherein receiving the analog signals comprises:
receiving the analog signals electronically.

12. The method of claim 8, further comprising:
receiving perceptible sound using the jack.

13. The method of claim 8, further comprising:
recovering the digital data from the analog signals received from the second device based on multi-carrier demodulation; and
encoding digital data into analog signals for transmission to the second device based on multi-carrier modulation.

14. The method of claim 13, further comprising:
detecting, via a sensor, whether a plug has been coupled to the single jack.

15. The method of claim 8, the method comprising determining if the apparatus may be placed in a digital data communication mode by determining that one of a mobile phone, a personal digital assistant or a smart phone is connected to the jack by way of transmission of a control signal and return of a response signal.

16. Apparatus for use in a first device to receive digital data non-wirelessly from a second device and to transmit digital data non-wirelessly to the second device, the apparatus comprising;
means for receiving through a single jack analog signals encoded with the digital data from the second device;
means for recovering the digital data from the analog signals received from the second device;
means for encoding digital data into analog signals for transmission to the second device; and
means for transmitting through the single jack analog signals encoded with digital data to the second device;
wherein the first device is one of a mobile phone, a personal digital assistant or a smart phone and wherein the second device is one of a mobile phone, a personal digital assistant or a smart phone and wherein the single jack is configured to couple to either one of a headphone or a headset.

17. The apparatus of claim 16, further comprising:
a non-wireless means for carrying the analog signals encoded with the digital data to the first device using the jack.

18. The apparatus of claim 16, wherein
means for recovering the digital data from the analog signals received from the second device is based on multi-carrier demodulation; and
means for encoding digital data into analog signals for transmission to the second device is based on multi-carrier modulation.

19. The apparatus of claim 18, further comprising:
means for detecting, via a sensor, whether a plug has been coupled to the single jack.

20. The apparatus of claim 16, wherein the single jack is configured to couple to either one of a headphone or a headset, the apparatus comprising means for determining if one of a mobile phone, a personal digital assistant or a smart phone is connected to the jack by way of transmission of a control signal and return of a response signal.

21. Apparatus for use in a first device to receive digital data non-wirelessly from a second device and to transmit data non-wirelessly to the second device, the apparatus comprising:
a single jack configured to receive analog signals encoded with the digital data from the second device and to transmit analog signals encoded with digital data to the second device;
a first conversion unit coupled to the single jack and configured to encode digital data into analog signals for transmission to the second device, the first conversion unit comprising
a forward error correction element,
an interleaver,
a digital modulator,
an inverse fast Fourier transform element,
an up-converter, and
a digital to analog converter; and a second conversion unit coupled to the single jack and configured to recover the digital data from the analog signals received from the second device, the second conversion unit comprising
an analog to digital converter,
a down-converter,
a synchronization unit,
a fast Fourier transform element,
a digital demodulator,
a de-interleaver, and
a decoder;
wherein the first device is one of a mobile phone, a personal digital assistant or a smart phone and wherein the second device is one of a mobile phone, a personal digital assistant or a smart phone.

22. The apparatus of claim 21, wherein the single jack is configured to couple to either one of a headphone or a headset, the apparatus comprising a determining circuit which determines that one of a mobile phone, a personal digital assistant or a smart phone is connected to the jack by way of transmission of a control signal and return of a response signal.

* * * * *

UNITED STATES PATENT AND TRADEMARK OFFICE
CERTIFICATE OF CORRECTION

PATENT NO. : 7,324,836 B2  Page 1 of 1
APPLICATION NO. : 10/670078
DATED : January 29, 2008
INVENTOR(S) : Jack Steenstra et al.

It is certified that error appears in the above-identified patent and that said Letters Patent is hereby corrected as shown below:

On the Title Page, Item (73) replace ASSIGNEE as follows:
  replace: Qualcomm Inc.
  with: -- Qualcomm Incorporated --

Signed and Sealed this

Twenty-seventh Day of May, 2008

JON W. DUDAS
*Director of the United States Patent and Trademark Office*